No. 861,368. PATENTED JULY 30, 1907.
C. A. JUENGST.
INSERTIBLE TEETH FOR SAW BLADES.
APPLICATION FILED APR. 19, 1905.
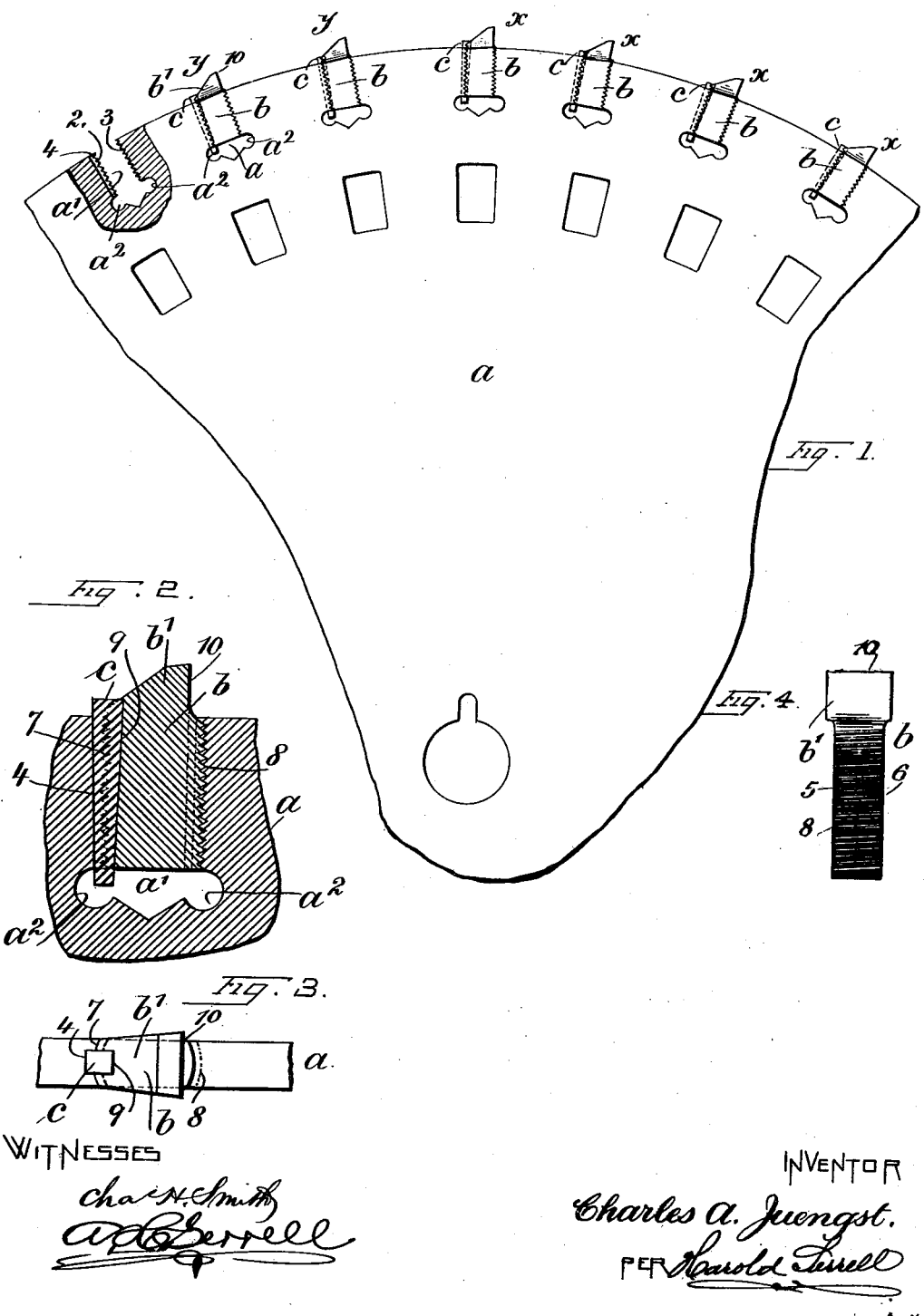

UNITED STATES PATENT OFFICE.

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

INSERTIBLE TEETH FOR SAW-BLADES.

No. 861,368.  Specification of Letters Patent.  Patented July 30, 1907.

Application filed April 19, 1905. Serial No. 256,375.

*To all whom it may concern:*

Be it known that I, CHARLES A. JUENGST, a citizen of the United States, residing at Croton Falls, in the county of Westchester and State of New York, have invented an Improvement in Insertible Teeth for Saw-Blades, of which the following is a specification.

My invention relates to saws with removable teeth, especially adapted for cutting metal. Heretofore the teeth of these saws have been inserted at equal spaced apart intervals, and it has been difficult to secure them firmly in position in the saw blade or disk. In sawing metal there is a perceptible vibratory movement of the work which is in unison with the equal spaced apart intervals of the teeth, and the tendency of this movement is to cause a wavy line of cut, which affects the speed of the saw, and the object of my invention is to obviate this difficulty.

In carrying out my invention I aim to destroy this vibratory movement and wavy line of cut by placing the teeth in series of any predetermined number, and the teeth of the respective series set at varying distances apart, and by screwing the teeth into their sockets in the saw blade and securing the same by a key in a key-way made in part in the tooth and in part in the saw blade, this key comes against the back of the tooth and performs the double function of locking the tooth to the blade by preventing the same turning and of holding the forward line of screw-threads so firmly in mesh that the cutting action has no tendency to lift the tooth; the tooth is also widened on the cutting face for effecting a clearance in the work.

In the drawing, Figure 1 is an elevation showing a portion of a saw blade or disk with a number of teeth in position, and a section of the blade at the place for one tooth which has been omitted. Fig. 2 is a section on the plane of the saw blade or disk with a tooth and its holding key in position. Fig. 3 is a plan of the parts shown in Fig. 2, and Fig. 4 is an elevation of the forward portion of the tooth.

$a$ represents a portion of the saw blade or disk provided with sockets $a'$, which, by preference are drilled radially into the edge of the blade or disk and tapped to form screw-segment edges 2, 3. One of these edges, that is, the one coming to the back of the tooth, is provided with a central key-way 4. At the base of each socket and on opposite sides I prefer to form recesses $a^2$ by drilling holes transversely through the saw blade or disk. These recesses provide clearance and for finishing the tapping of the threads and for the bases or lower ends of the keys in securing the teeth in position.

$b$ represents the shank of the insertible teeth. Each tooth shank is formed with parallel sides 5, 6, the thickness of the tooth agreeing substantially or exactly with the thickness of the saw-blade or disk. Opposite sides of the tooth 7, 8 are curved to agree with the arc of the drill forming the sockets $a'$, and these sides or surfaces 7, 8 are formed with segment threads, so that the tooth may be screwed into the sockets to place. The screw-segment side 7 of each tooth is provided with a central key-way 9, and when the tooth is in position a key $c$ is passed down through the key-ways 4 and 9 and is driven to place, securing the tooth in position: each tooth is inserted in like manner.

The teeth are made with cutting edges 10 and the head $b'$ of the teeth is tapered from the cutting edge back to the heel, as will appear from Figs. 1 and 2. This tapering head $b'$ is also tapering at the opposite sides from the heel forward to the cutting edge, for the cutting edge is made wider so that there shall be clearance in action.

Referring to Fig. 1 it will be noticed that the four teeth $x$, form a series and that the teeth $y$, belong to a second series. The four teeth $y$, are set at varying distances apart—that is to say—the third tooth from the right is a less distance from the second tooth than the second tooth is from the first, and the fourth tooth is a less distance from the third than the third is from the second. On the other hand, the first tooth $y$, is the same distance from the last or fourth tooth $x$, as the second tooth $x$, is from the first. These varying distances are maintained between the respective teeth of each series, and I prefer each series to consist of at least three or four teeth. The distance between the last tooth of a series and the first tooth of an adjoining series may be the same or greater than the distance between the first two teeth of a series. By thus spacing the teeth at varying distances apart I destroy the vibratory movement of the work and consequently the wavy line of cut in the work produced by the teeth, said line of cut being substantially even and regular and it being possible in this manner to cut more rapidly, as the retarding action produced by the vibratory movement and the wavy line of cut is no longer present. The useful life of the teeth is also in this manner prolonged as well as producing an increase in the amount of material that the saw can cut in a given space of time.

To remove a tooth and insert another in its place, an instrument is to be inserted below the lower end of its key $c$, in the recess $a^2$, and the key raised and removed, after which the tooth may be rotated until removed and a new one inserted in the reverse manner.

I claim as my invention:

1. The combination with a saw-blade having radially disposed open-sided sockets with threaded edges, of insertible teeth having flat parallel sided screw-threaded shanks, and means for securing the teeth in the saw-blade against rotation.

2. The combination with a saw-blade having radially disposed open-sided sockets with threaded edges, of insertible teeth with shanks having flat parallel sides and curved screw-segment edges, a key-way in one threaded edge of said socket and a second key-way in the adjacent threaded edge of the tooth shank, and a key received in said key-ways and acting to hold the tooth in place.

3. The combination with the saw blade having radially disposed peripheral sockets with threaded edges, of insertible teeth having flat parallel sides and curved screw segment edges adapted to be screwed into said sockets and means for securing the teeth in place and preventing them turning.

4. The combination with the saw blade having radially disposed peripheral sockets with threaded edges and an intermediate key-way in one of said edges, of insertible teeth having flat parallel sides and curved screw segment edges adapted to be screwed into said sockets and having a key-way intermediate of one screw segment edge, and keys fitting said key-ways to secure the teeth in position and prevent the same turning.

Signed by me this fourteenth day of April 1905.

CHAS. A. JUENGST.

Witnesses:
GEO. T. PINCKNEY,
S. T. HAVILAND.